Figure 1:
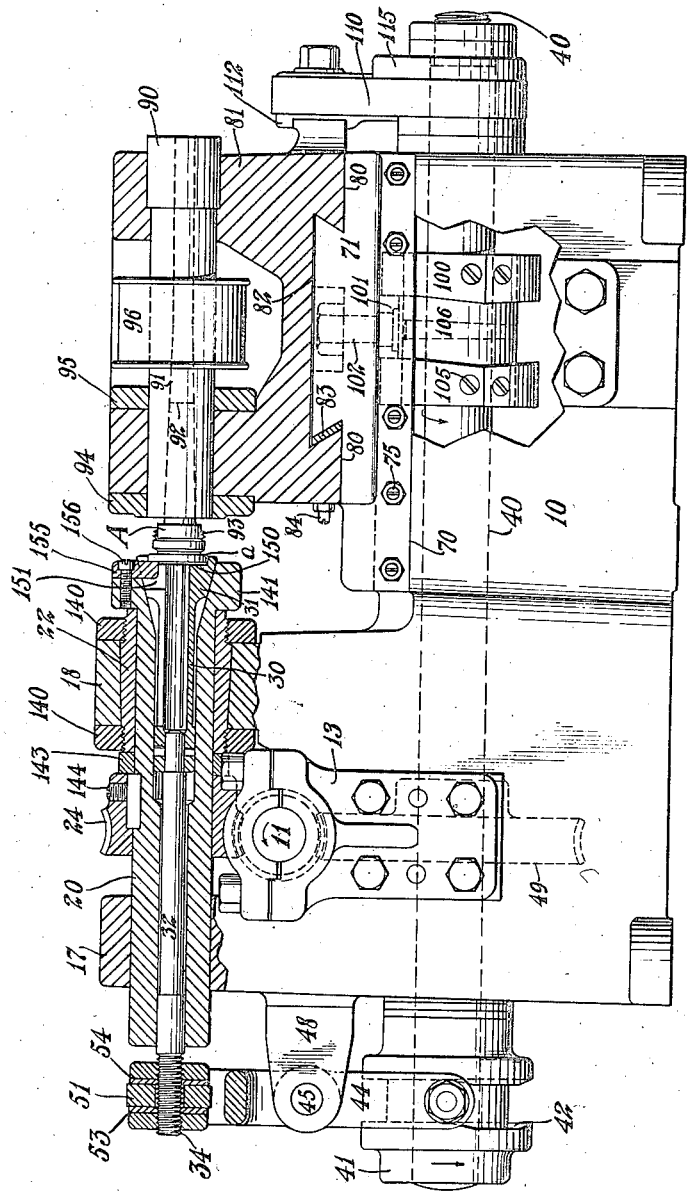

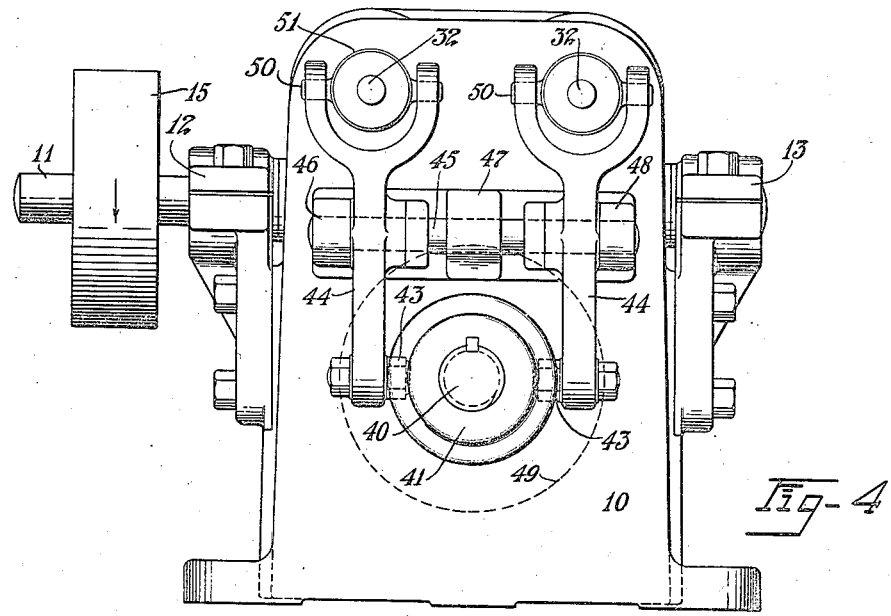
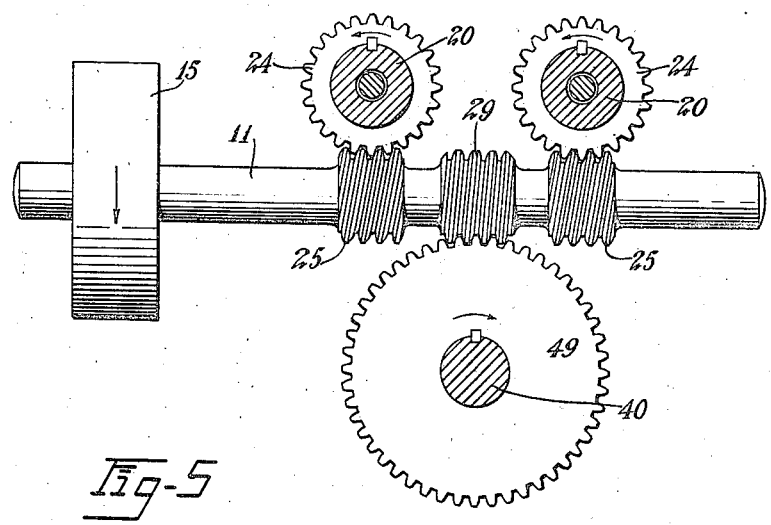

UNITED STATES PATENT OFFICE.

GEORGE T. TRUNDLE, JR., OF CLEVELAND, OHIO, ASSIGNOR TO THE AMERICAN MULTIGRAPH COMPANY, OF CLEVELAND, OHIO, A CORPORATION OF OHIO.

THREAD-MILLING MACHINE.

1,216,019.      Specification of Letters Patent.      Patented Feb. 13, 1917.

Application filed October 11, 1915. Serial No. 55,161.

*To all whom it may concern:*

Be it known that I, GEORGE T. TRUNDLE, Jr., a citizen of the United States, residing at Cleveland, in the county of Cuyahoga and State of Ohio, have invented a certain new and useful Improvement in Thread-Milling Machines, of which the following is a full, clear, and exact description, reference being had to the accompanying drawings.

This invention relates to a machine for milling threads on articles, the object being to provide mechanism for this purpose which, while accurately milling the thread, may operate with great rapidity.

My invention is adapted for milling the threads on a great variety of articles, among which may be mentioned the milling of external threads on suitable plugs. A preferred embodiment of the invention designed for the latter use is illustrated in the drawings hereof and hereinafter more fully explained. The essential characteristics of the invention are summarized in the claims.

Figure 2:
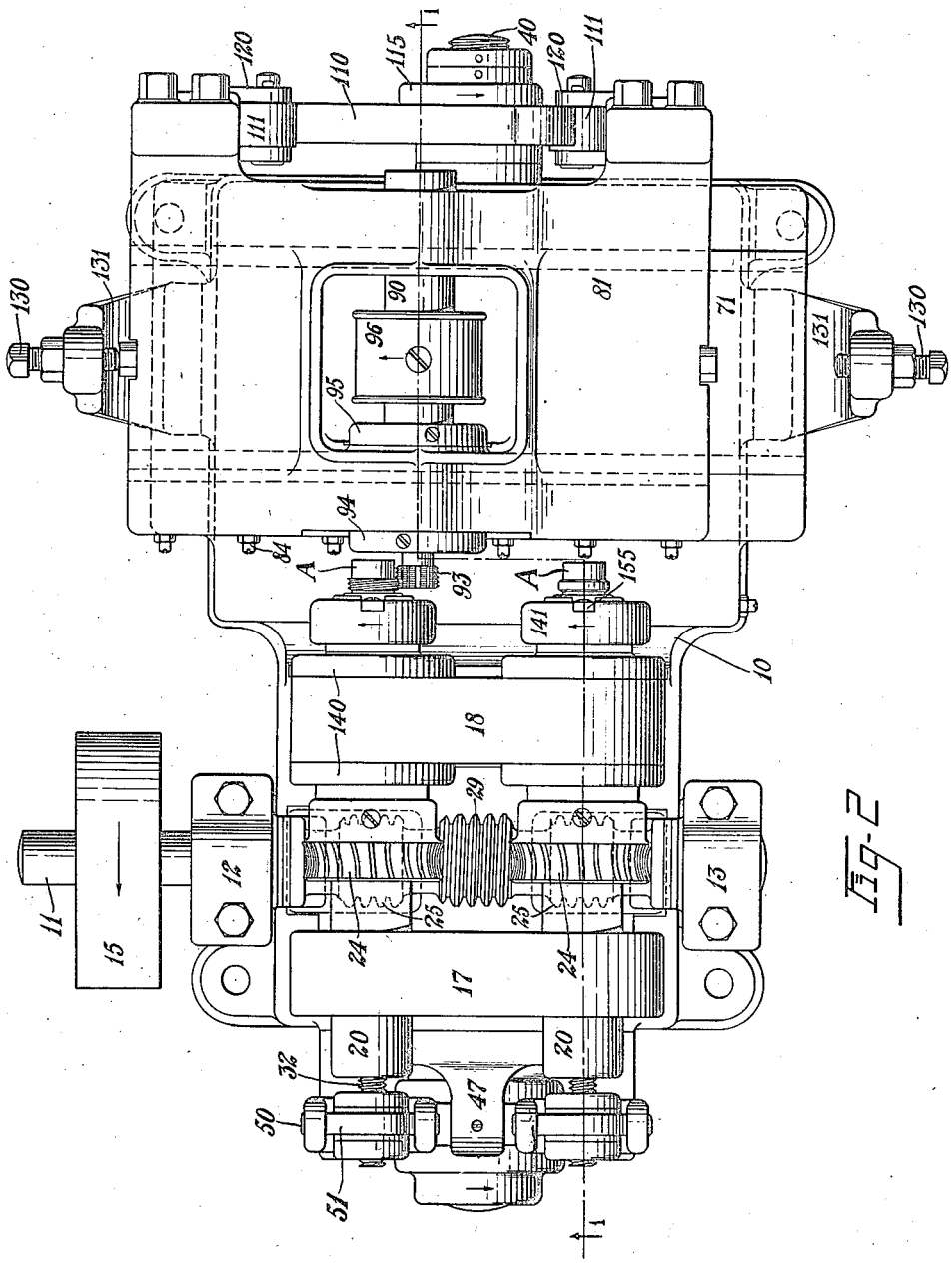
Figure 3:
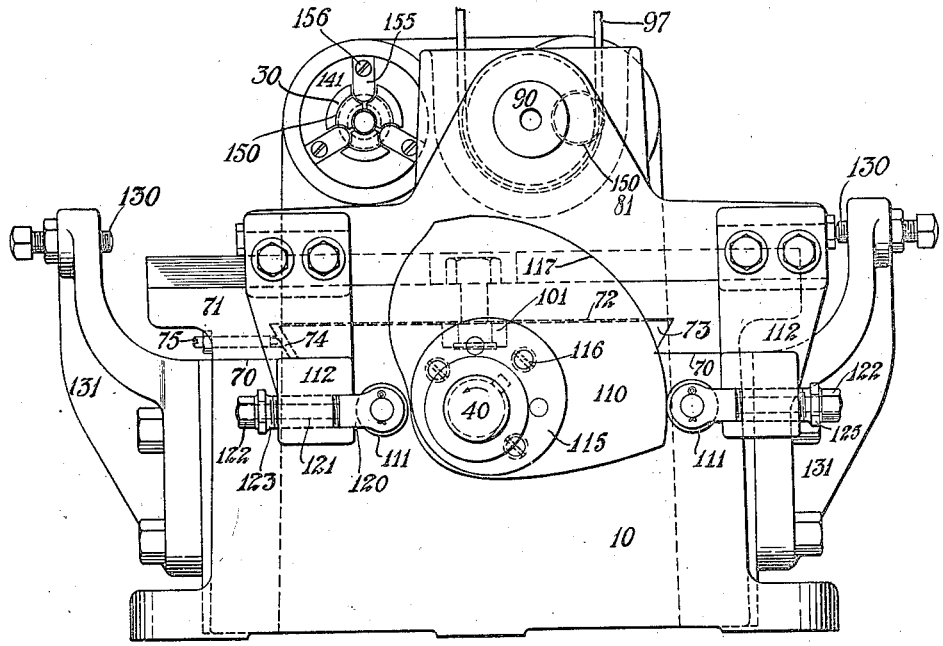
Figure 6:
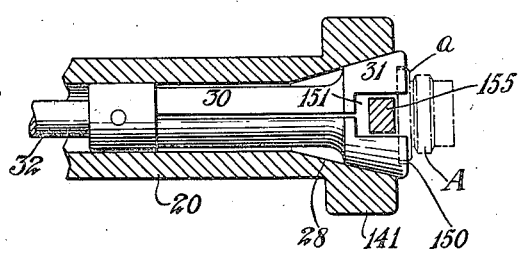
Figure 7:
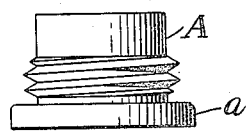

In the drawings, Figure 1 is a sectional side elevation of the machine; Fig. 2 is a plan thereof; Fig. 3 is an end view looking from the right hand end of Fig. 1; Fig. 4 is an end view looking from the left hand end of Fig. 1; Fig. 5 is a sectional elevation in a plane parallel with Fig. 4 of the drive shaft and its driven gears; Fig. 6 is an enlarged view of one of the chucks employed in the machine; and Fig. 7 is a side elevation of a suitable plug threaded by this apparatus.

The bed of the machine is designated 10. Suitably carried by it and extending transversely is the drive shaft 11, this shaft being shown as journaled in bearing brackets 12 and 13 bolted to the sides of the bed. The shaft is provided with any suitable means for rotating it, as, for example, the pulley 15. Extending longitudinally of the machine and above the drive shaft are a pair of parallel tubular spindles 20 which are rotatably mounted in upwardly extending portions 17 and 18 of the frame. The part 18 shows liners 22 surrounding the spindles, as hereinafter more fully explained. Each spindle has rigid on it a worm wheel 24, these two worm wheels meshing with two worms 25 on the shaft 11. Accordingly, the shaft is adapted to rotate the tubular spindles. The spindles carry suitable chucks for holding the work. An intermediately located shiftable cutter is adapted to mill threads on the blank held by the chuck of one spindle and then be shifted to mill threads on the blank held by the chuck of the other spindle, as is hereinafter more fully described.

In the specific embodiment shown the article to be milled consists of a plug A of the form shown in Figs. 1, 2, 6 and 7 having a body and a head *a*. The chuck is designed to grasp this head. The chuck comprises a split spring sleeve or collet 30 having a conical split head 31 adapted to seat within a conical recess 28 in the forward end of the spindle 20. Secured to the inner end of the collet is a rod 32 extending out of the sleeve and provided with means whereby the collet may be drawn into the tubular spindle to clamp the work or shoved sufficiently in the opposite direction to release the work.

Extending longitudinally of the machine is a shaft 40 projecting beyond each end of the bed. On the left hand end this shaft is provided with a double crown cam 41. The groove of this cam is occupied at diametrically opposite points by rollers 43 on the lower ends of levers 44 which are journaled on a transverse rod 45 mounted in bracket ears 46, 47 and 48 on the end of the bed. Above the rod 45 each lever 44 is bifurcated and yokes onto opposite sides of the corresponding rod 32. At such point the yokes carry the trunnions 50 of rings 51 which occupy grooves provided by abutments 53 and 54 secured to the rods 32. Each of these abutments is shown as consisting of an outer nut and an inner lining or jam nut, all of which are mounted on the threaded ends 34 of the rods 32.

It will be seen from the construction described that the rotation of the shaft 40 may swing the levers 44 in and out, thus shifting the rods 32 in one direction or the other and clamping the collet or releasing it. The shaft 40 is suitably geared to the main drive shaft 11, as, for example, by means of a worm wheel 49 on the shaft meshing with a worm 29 on the shaft 11, which also rotates the chucks. Accordingly, the engagement and release of the chuck is timed with reference to its rotation, and the work is therefore adapted to be given just the desired amount of rotation. The cam 41 has a portion of its groove offset away from the machine, as shown at 42 in Fig. 1, to release the chuck, this cam portion acting alternately on the shifters of the respective chucks. The major portion of the groove, however, is straight and adapted to maintain the collet compressed. As hereinafter more fully explained, the cam portion 42 allows time for the removal of the threaded article and the placing of a fresh blank, and the straight portion provides for holding the collet closed for the rest of the time.

The bed is provided with a pair of longitudinal ways 70, on which is mounted a slide 71. This slide is shown as provided in its lower face with a dove-tailed recess 72 occupied by an upwardly extending corresponding portion 73 of the bed. A liner 74 between these parts, adjusted by set screws 75, insures a snug sliding fit. The slide 71 carries transverse ways 80, on which is mounted a carriage 81, the carriage being shown as having a downwardly facing dove-tailed recess 82 occupied by a corresponding part of the slide. A liner 83 adjusted by set screws 84 keeps a snug sliding engagement.

In the upper portion of the carriage 81 is mounted the cutter spindle 90. This is shown as a tubular member having a tapered opening 91 which may be occupied by the tapered shank 92 of the cutter 93. The spindle is prevented from shifting by suitable means, as, for example, the collars 94 and 95 clamped to it. The spindle is provided with a suitable pulley 96 by which it may be rotated by a belt 97.

The universal slide construction described enables the cutter to be shifted laterally, longitudinally or diagonally in a horizontal plane, as desired, while it may be continuously rotated by the pulley 96. The cutter may thus act on its right hand side against the left hand side of one blank A, and then, after shifting, the left hand side of the cutter may act against the right hand side of the other blank. As the two blanks and the cutter all rotate in the same direction this causes the cutter and the work to move past each other in opposite directions, whichever blank is engaged.

The longitudinal shifting of the cutter spindle is accomplished by a grooved cam 100 on the shaft 40 which coacts with a roller 101 on the lower end of a stud 102 carried by the slide 71. The transverse shifting of the cutter spindle is accomplished by a cam 110 on the end of the shaft 40 which coacts with rollers 111 carried by brackets 112 depending from the carriage 81.

The longitudinal movement of the cutter controlled by the cam 100 determines the pitch of the thread cut, while the lateral movement controlled by the cam 110 determines the depth of the cut. Accordingly, these cams are preferably made adjustable to provide for the cutting of different threads. The cam 100 is readily formed of separate segments secured by screws 105 to a suitable body or hub 106 which is shown as pinned to the shaft 40. The cam 110 is preferably removable from a hub portion which engages the shaft. The drawing shows such hub at 115 keyed to the shaft 40 and secured by screws 116 to the cam.

The engagement of the rollers 111 with the cam is accurately adjusted by mounting these rollers in yokes which are adjustably carried by bracket arms 112 bolted to the slide 81. As shown, each of these yokes 120 has a stem 121 carrying on its opposite end a nut 122. The stem extends through a bushing 123 which is externally threaded in the bracket arm 112. The turning of the bushing (for example, by means of the angular head 125 thereon) adjusts the approach of the roller toward or from the cam, the roller being maintained in the upright position by loosening the nut 122 and turning the roller, as necessary, after which the stem is tightly clamped to the bushing.

I prefer not to rely on the rollers 111 to furnish the limit for lateral movement of the carriage, but I provide for this purpose fixed abutments shown as consisting of set screws 130 carried by bracket arms 131 bolted to the sides of the frame. These set screws are adjusted and clamped so that the carriage will have just the right amount of possible shift to give the proper depth of cut by the cutter. Then the rollers 111 are adjusted to have the desired engagement with the cam 110.

In the embodiment of the machine shown, the cutter 93 shifts into engagement with the stock adjacent to the head thereof and cuts on a longitudinal movement of the cutter away from such head, though, if desired, this direction of motion may be reversed. It will be seen that the cutter has as many sets of teeth as there are threads to be cut and that the longitudinal movement of the cutter is equal to the distance between threads, this one longitudinal movement of the continuously rotating cutter accompanied by somewhat more than one complete rotation of the stock, completing the thread to be cut. This longitudinal movement of the cutter is caused by the cam 100 while a concentric portion 117 of the cam 110 is engaging the corresponding roller 111. At the end of this outward longitudinal movement of the cutter, that is, at the completion of the cut, the cam 110 shifts the cutter toward the other chuck spindle. While doing so, the cam 100 shoves the cutter longitudinally inwardly or toward the left hand, as shown in Fig. 2, so that, when it comes into engagement with the other plug A it is in position to mill it on the outward stroke of the cutter. The cutter thus has a four-way movement, two of its paths being parallel with the axes of the chuck-spindles, and the alternate paths being transverse and somewhat diagonal so that they cross each other intermediately.

It will be understood that the cam 100 is accurately formed to give just the desired longitudinal movement of the cutter. Accuracy of lateral movement is effected as above described by the abutment screws 130 and the adjustable rollers 111. To cause the work to be accurately positioned with reference to the cutter I have provided an abutment for such work carried by the chuck spindle and thus revolving in a fixed vertical plane, though the amount of movement of the collet within the chuck spindle may vary. This abutment will now be described.

As shown in Fig. 1, the chuck spindle is mounted in the lining sleeve 22 carried by the frame part 18. This lining sleeve (which may be split and externally tapered to cause a snug bearing for the spindle) is shown as rigidly locked to the frame part 18 by nuts 140 on the liner. At one end the liner extends into engagement with the head 141 of the spindle. At the other end it engages a suitable distance ring 143 between it and the worm wheel 24, which is rigidly locked in place by the set screw 144. The collet has a circular recess 150 (Figs. 1 and 6) in its head which is adapted to be occupied by the blank A. A notch 151 is formed in this collet across each of the kerfs thereof, and into this notch extends a block 155 rigidly secured to the head 141 of the spindle, a screw 156 being shown for so securing it.

The collar 53 on the rod 32 is so adjusted that the collet, when seated, is always drawn into the cone of the spindle a sufficient distance to carry the stock against the abutment blocks 155, the face of the recess 150 drawing slightly away from the head $a$ of the stock. Accordingly, the abutments 155 which are accurately positioned, accurately locate the stock, irrespective of inaccuracies in its periphery, etc.

The operation of my device is entirely automatic, with the exception of placing the stock in the chucks. While the cutter is operating on one article, the other blank is placed by hand in the open collet of the other spindle and immediately clamped by that spindle. As soon as the first article is completed the cutter moves away from it, and the collet releases it and it drops by gravity and may be caught in any suitable trough or receptacle, not shown.

It is convenient for the operator to stand at the right hand end of the machine, as shown in Figs. 1 and 2, facing the chucks, and, with his arms extended onto opposite sides of the belt 97, he may take the blanks from a suitably accessible supply and alternately place them in the two chucks, one with the right and the other with the left. As the cutter cuts all the threads at once so that only one complete rotation of the stock after the cutter reaches proper depth therein is necessary for the cutting, it will be seen that the machine may be operated with great rapidity. In fact, the limit of rapidity is apparently controlled by the speed with which the blanks may be placed in the chucks.

The amount of actual rotation of the chuck spindle in any complete cycle is made up as follows: at least one rotation for each spindle during cutting movement; a slight addition thereto during the time the cutter is reaching its maximum depth in starting the cut; this same movement (a rotation and a fraction) for each spindle while the cutter is operating at the other spindle, and sufficient additional movement to allow time for the transverse shifting of the cutter from each chuck to the other. These periods may be conveniently provided for if each chuck spindle makes approximately four rotations to each cycle of movement, such cycle corresponding to one complete rotation of the shaft 40. By an inspection of the gears, as shown in Fig. 5, it will be seen that such is the ratio of the movement in the embodiment shown, the worms 25 engaging the worm wheels on the chuck spindles being of a pitch double that of the worm 29 engaging the worm wheel 49 on the shaft 40, and the worm wheel on the latter shaft being shown as having twice the number of teeth of the worm wheels on the chuck spindles.

Having thus described my invention, what I claim is:

1. In a thread milling machine, the combination of a plurality of rotatable chucks, a rotatable cutter, and means for moving the cutter into engagement with stock carried by one chuck and longitudinally of the axis of such stock, and thereafter into engagement with stock in another chuck and longitudinally of its axis.

2. In a thread milling machine, the combination of a plurality of rotatable chucks, the axes of which are stationary, a rotatable cutter adapted to cut a plurality of threads at one time, means for moving the cutter into engagement with stock carried by one chuck and then lengthwise of the axis of said stock while eccentric thereto, and then moving it into engagement with stock carried by another chuck and lengthwise of its axis while eccentric thereto.

3. The combination of a pair of rotatable chucks, a rotatable cutter, and means for giving the cutter a four-way movement to cause it to successively engage the stock in the two chucks and travel along the same eccentrically of the axis thereof.

4. The combination of a pair of parallel rotatable chucks, a rotatable cutter, the axis of which is parallel with the chucks and intermediate thereof, means for rotating the chucks and cutter in the same direction, and means for giving the cutter a movement to cause oppositely positioned portions thereof to alternately engage the stock in the two chucks and travel along the same in the same direction.

5. The combination with a pair of rotatable chucks, of a rotatable cutter, extending between the stock carried by the two chucks, means for giving said cutter a four-way movement, two portions of said movement being parallel with the axes of the chucks and the other two portions being transverse and diagonal, these latter paths thus crossing each other between the axes of the chucks.

6. The combination of rotatable work-holding chucks, a rotatable cutter, coacting slides carrying the cutter, and means for moving said slides at right angles to each other to present the cutter to the blanks held by the different chucks and move the cutter along such blanks when so presented.

7. The combination of a pair of rotatable chucks mounted on stationary axes, a pair of slides one surmounting the other and one movable transversely and the other longitudinally, a cutter carried by one of said slides, and means for operating the slides to shift the cutter between the stock carried by the two chucks and also along such stock.

8. In a thread milling machine, the combination of a pair of rotatable chucks mounted parallel with each other on stationary axes, a rotatable cutter, the axis of which is intermediate of the axes of the chucks, longitudinally and laterally movable slides carrying the cutter, and a pair of cams for moving the respective slides.

9. In a thread milling machine, the combination of a pair of rotatable chucks, a rotatable cutter, longitudinally and laterally movable surmounting slides carrying the cutter, a shaft, a grooved cam thereon adapted to move the longitudinal slide, and a radial cam on said shaft adapted to move the lateral slide.

10. The combination with a pair of rotatable chucks side by side, surmounting slides, one of which is adapted to move longitudinally and the other laterally, a rotatable cutter carried by one of the slides and adapted to stand between the stock carried by said chucks, and a pair of cams for moving the two slides to give the cutter a four-way movement having parallel longitudinal paths and crossing transverse paths.

11. The combination of a pair of tubular spindles, each spindle having an internal longitudinal rod, a chuck at the end of each spindle carried by it and controlled by the rod, a cutter occupying an intermediate position between the axes of the spindles, means for giving the cutter a four-way movement to engage and travel along the work carried by either chuck, and means for alternately operating said rods.

12. The combination of a pair of tubular spindles, each spindle having an internal longitudinal rod, a chuck at the end of the spindle carried by it and controlled by the rod, a cutter, means for giving the cutter movement to cause it to engage and travel along the work carried by either chuck, a rotatable cam, and a pair of shifting levers for the rods connected with said cam, whereby the rods are alternately shifted.

13. The combination of a pair of tubular spindles, each spindle having an internal longitudinal rod, a chuck at the end of the spindle carried by it and controlled by the rod, a cutter occupying an intermediate position between the axes of the spindles, coacting longitudinally and laterally movable slides carrying the cutter, a shaft, and cams thereon for moving the chuck rods and the respective slides.

14. In a thread milling machine, the combination of a pair of parallel spindles mounted on stationary axes, chucks carried by said spindles, a milling cutter, a universal slide carrying the cutter, a longitudinal shaft, cams on said shaft for operating the slide laterally and longitudinally, a transverse driving shaft between the spindles and longitudinal shaft, worm wheels on the spindles and on the longitudinal shaft, and worms on the transverse driving shaft meshing with said worm wheels.

15. In a thread milling machine, the combination with a rotatable cutter, of a rotatable spindle, a longitudinally movable chucking member within said spindle adapted to engage stock and clamp the same in position for coaction with the cutter as the chucking member is drawn into the spindle, and an abutment carried by the spindle and extending into the path of the stock in such movement, thereby forming a fixed limit for the stock though the position of the chucking member may vary.

16. The combination of a rotatable tubular spindle, a longitudinally movable chucking member within said spindle adapted to engage stock and clamp the same as the chucking member is moved lengthwise of the spindle, and an abutment carried by the spindle and extending into the path of the stock in such movement, thereby forming a fixed limit for the stock though the position of the chucking member may vary.

17. The combination of a rotatable spindle having a conical recess, a split sleeve within the spindle having a conical exterior adapted to coact with the recess to contract the sleeve, a recess for stock in the face of the sleeve, and an abutment carried by the spindle and extending inwardly beyond the boundary of the recess and intersecting the path of movement of the base of the recess.

18. The combination of a rotatable spindle having a conical recess, a collet within the spindle having a conical head separated by the kerfs into a plurality of clamping members, notches in said head, and abutments carried by the spindle and extending radially inward into said notches, said abutments not interfering with the movement of the head.

19. In a thread milling machine, the combination with a rotatable cutter, of a rotatable spindle having a conical recess, a collet within the spindle having a conical head separated by the kerfs into a plurality of clamping members, notches in said head, abutments carried by the spindle and extending radially inward into said notches, a central recess formed in the face of the head, the abutments extending radially inward beyond the boundary of the recess, said abutments being located behind the base of the recess when the chuck is opened and in front of the base of the recess when the chuck is closed.

20. In a thread milling machine, the combination with a bed, of a pair of rotatable chucks carried thereby, a slide carried by said bed, another slide mounted on the slide first mentioned and movable at right angles thereto, a rotatable cutter spindle carried by the upper slide and lying in substantially the same plane with the chucks, and means for moving the two slides.

21. In a thread milling machine, the combination with a bed, of a pair of parallel tubular spindles carried thereby, chucking devices within the spindles having longitudinal operating rods axial of the spindles, shifting devices for said rods, a slide carried by said bed, another slide mounted on the slide first mentioned and movable at right angles thereto, a rotatable cutter spindle carried by the upper slide, a longitudinal shaft mounted in the bed of the machine, and cams on said shaft for operating the shifting devices and said slides.

22. The combination of a pair of tubular spindles, each spindle having an internal longitudinal rod, a chuck at the end of the spindle carried by it and controlled by the rod, a cutter occupying an intermediate position between the axes of the spindles, a universal slide carrying the cutter, a longitudinal shaft, cams on said shaft for operating the universal slide laterally or longitudinally, a grooved cam on said shaft, and a pair of intermediately pivoted levers having yokes at their upper ends connected with the respective chuck rods and each carrying a roller at its lower end engaging the groove of the last mentioned cam.

23. In a thread milling machine, the combination with a bed, of a pair of parallel tubular spindles carried thereby, chucking devices carried by the spindles, a slide carried by said bed, another slide mounted on the slide first mentioned and movable at right angles thereto, a rotatable cutter spindle carried by the upper slide in substantially the same plane with the spindles first mentioned, a longitudinal shaft mounted within the bed of the machine, a grooved cam on said shaft, a roller carried by the lower slide occupying said groove, a cam on the end of the shaft, and a pair of rollers carried by the upper slide coacting with opposite sides of the last mentioned cam.

24. In a thread milling machine, the combination of a pair of rotatable chucks mounted parallel with each other on stationary axes, a rotatable cutter, the axis of which is intermediate the axes of the chucks, longitudinally and laterally movable slides carrying the cutter, a cam for moving the longitudinal slide to provide a movement commensurate with the pitch of the thread, and a cam for moving the laterally movable slide to shift the cutter from one chuck to the other.

25. In a thread milling machine the combination of a pair of rotatable chucks adapted to hold articles to be threaded, a rotatable cutter adapted to mill such threads, longitudinally and laterally movable surmounting slides carrying the cutter, a shaft, a grooved cam thereon adapted to move the longitudinal slide a distance corresponding to the pitch of the thread, and a rotatable cam on said shaft adapted to move the lateral slide to shift the cutter from one article to the other.

26. In a thread milling machine, the combination of a plurality of rotatable workholders, a cutter adapted to simultaneously engage the work at a number of points, and means for causing such relative movement between the cutter and work-holders that the cutter engages one piece of stock at points eccentric to the axis thereof and then moves along such stock and thereafter engages another piece of stock and moves along it.

27. In a thread milling machine, the combination of a pair of rotatable work-holding chucks, a cutter adapted to simultaneously engage the work at a number of points, and means for causing such relative movement between the cutter and chucks that the cutter engages one piece of stock at points eccentric to the axis thereof and then moves in a path parallel with such axis, and thereafter performs a similar operation on the other piece of stock.

28. The combination of a plurality of rotatable chucks, a cutter, and means for moving the cutter into engagement with the stock carried by one chuck at a point eccentric to the axis of rotation thereof and then longitudinally and thereafter into engagement with stock in another chuck at a point eccentric to the axis of rotation, and then longitudinally.

29. The combination of a plurality of rotatable chucks, a cutter adapted to simultaneously engage the work at a number of points, means for moving the cutter into engagement with the stock carried by one chuck at points eccentric to the axis thereof and then longitudinally parallel with such axis, and thereafter into engagement with stock in another chuck at points eccentric to the axis thereof, and then longitudinally, parallel with that axis.

30. The combination of a pair of rotatable work-holding chucks, a cutter, means for giving the cutter a fourway movement to cause it to successively engage stock in the two chucks at points eccentric to the axes of rotation thereof, and while having such engagement to move in one direction only, the cutter leaving the stock at a different point from its point of engagement therewith.

31. In a thread milling machine, the combination of a pair of rotatable work-holding chucks, a rotatable cutter having teeth spaced according to the pitch of the thread to be cut, means for giving the cutter a fourway movement to cause it to successively engage the stock in the two chucks at points eccentric to the axes of rotation thereof, and while having such engagement to move in one direction only, the cutter leaving the stock at a different point from its original point of engagement therewith.

32. In a thread milling machine, the combination with a plurality of rotatable work-holding chucks, of a cutter having teeth corresponding to successive threads to be cut, means for causing said cutter to engage stock in one of the chucks and while in such engagement to move longitudinally a distance corresponding to the pitch of the thread during the time the stock is making substantially one complete rotation, and means for thereafter causing the cutter to engage stock in the other chuck, and move longitudinally a distance corresponding to the pitch during substantially one rotation of such cutter.

33. In a thread milling machine, the combination of a rotary cutter having teeth corresponding to successive threads to be cut, a pair of rotary chucks adapted to hold individual pieces of stock, means for causing said cutter to engage stock in one of the chucks at points eccentric to the axis thereof and while in such engagement to move parallel with the axis of rotation of the stock a distance equal to the pitch of the thread during the time the stock is making substantially one complete rotation, and means for thereafter causing the cutter to engage stock in the other chuck at points eccentric to the axis thereof, and move parallel with the axes of such stock a distance equal to the pitch of the thread during substantially one rotation of such stock, and then to return to its first position.

34. The combination with a pair of workholding chucks, of a cutter having teeth corresponding to the thread to be cut, means for causing the cutter to engage stock in one chuck and move longitudinally thereof a distance corresponding to the pitch of the thread, and means for thereafter causing the cutter to engage stock in the other chuck, and move longitudinally a distance corresponding to the pitch of the thread during substantially one rotation of such stock.

In testimony whereof, I hereunto affix my signature.

GEORGE T. TRUNDLE, Jr.